United States Patent
Zengin et al.

(10) Patent No.: US 11,951,964 B2
(45) Date of Patent: Apr. 9, 2024

(54) METHOD AND SYSTEM FOR CONTROL OF TRAILER SWAY

(71) Applicant: GM GLOBAL TECHNOLOGY OPERATIONS LLC, Detroit, MI (US)

(72) Inventors: Halit Zengin, Bowmanville (CA); Joseph K Moore, Whitby (CA); Benjamin J Eles, Goodrich, MI (US)

(73) Assignee: GM GLOBAL TECHNOLOGY OPERATION LLC, Detroit, MI (US)

( * ) Notice: Subject to any disclaimer, the term of this patent is extended or adjusted under 35 U.S.C. 154(b) by 282 days.

(21) Appl. No.: 17/648,501

(22) Filed: Jan. 20, 2022

(65) Prior Publication Data

US 2023/0227011 A1    Jul. 20, 2023

(51) Int. Cl.
*B60T 8/17* (2006.01)
*B60T 7/20* (2006.01)
*B60T 8/1755* (2006.01)

(52) U.S. Cl.
CPC ............ *B60T 8/1708* (2013.01); *B60T 7/20* (2013.01); *B60T 8/1755* (2013.01); *B60T 2230/06* (2013.01)

(58) Field of Classification Search
CPC ........ B60T 8/1708; B60T 7/20; B60T 8/1755; B60T 2230/06; B60T 8/17551
See application file for complete search history.

(56) References Cited

U.S. PATENT DOCUMENTS

| 2011/0022282 A1* | 1/2011 | Wu | B60T 8/1708 701/70 |
| 2011/0029210 A1* | 2/2011 | Wu | B60D 1/58 188/112 A |

* cited by examiner

*Primary Examiner* — Jacob M Amick
(74) *Attorney, Agent, or Firm* — Lorenz & Kopf LLP (57) ABSTRACT

Methods and systems are provided for a vehicle towing a trailer. In an exemplary embodiment, one or more sensors onboard a vehicle are configured to provide sensor data, and a processor onboard the vehicle is configured to at least facilitate: monitoring a trailer sway of the trailer using the sensor data, based on one or more parameters of the sensor data representing the trailer sway and application of a band-pass filter to the one or more parameters; and mitigating the trailer sway, via instructions provided by the processor to one or more braking systems of the vehicle, the trailer, or both, when it is determined that the trailer sway of the trailer is sufficient to warrant mitigation based on the one or more parameters of the sensor data representing the trailer sway and the application of the band-pass filter to the one or more parameters.

16 Claims, 4 Drawing Sheets

METHOD AND SYSTEM FOR CONTROL OF TRAILER SWAY

INTRODUCTION

The technical field generally relates to vehicles and, more specifically, to methods and systems for controlling vehicles towing trailers and controlling sway generated by the trailer.

Certain vehicles today are equipped to tow a trailer during travel. However, such existing vehicles may not always provide optimal control of the vehicle and trailer with respect to sway of the trailer.

Accordingly, it is desirable to provide improved methods and systems for controlling vehicles and trailers, including sway of the trailer. Furthermore, other desirable features and characteristics of the present invention will become apparent from the subsequent detailed description of the invention and the appended claims, taken in conjunction with the accompanying drawings and this background of the invention.

SUMMARY

In accordance with an exemplary embodiment, a method is provided that includes: obtaining sensor data from one or more sensors onboard a vehicle that is towing a trailer, the vehicle and trailer collectively including a vehicle-trailer system; monitoring, via a processor disposed onboard the vehicle, a trailer sway of the trailer using the sensor data, based on one or more parameters of the sensor data representing the trailer sway and application of a band-pass filter to the one or more parameters; and mitigating the trailer sway, via instructions provided by the processor to one or more braking systems of the vehicle-trailer system, when it is determined that the trailer sway of the trailer is sufficient to warrant mitigation based on the one or more parameters of the sensor data representing the trailer sway and the application of the band-pass filter to the one or more parameters.

Also in an exemplary embodiment: the monitoring includes monitoring, via the processor onboard the vehicle, the trailer sway of the trailer using the sensor data, based on a hitch articulation angle of the vehicle-trailer system and application of the band-pass filter to the hitch articulation angle; and the mitigating includes mitigating the trailer sway, via the instructions provided by the processor to the one or more braking systems of the vehicle-trailer system, when it is determined that the trailer sway of the trailer is sufficient to warrant mitigation based on the hitch articulation angle and the application of the band-pass filter to the hitch articulation angle.

Also in an exemplary embodiment: the monitoring includes monitoring, via the processor onboard the vehicle, the trailer sway of the trailer using the sensor data, based on a yaw rate of the vehicle and application of the band-pass filter to the yaw rate; and the mitigating includes mitigating the trailer sway, via the instructions provided by the processor to the one or more braking systems of the vehicle-trailer system, when it is determined that the trailer sway of the trailer is sufficient to warrant mitigation based on the yaw rate and the application of the band-pass filter to the yaw rate.

Also in an exemplary embodiment: the monitoring includes monitoring, via the processor onboard the vehicle, the trailer sway of the trailer using the sensor data, based on a hitch articulation angle of the vehicle-trailer system and a yaw rate of the vehicle, along with an application of the band-pass filter to the hitch articulation angle and to the yaw rate; and the mitigating includes mitigating the trailer sway, via the instructions provided by the processor to the one or more braking systems of the vehicle-trailer system, when it is determined that the trailer sway of the trailer is sufficient to warrant mitigation based on the hitch articulation angle, the yaw rate, and the application of the band-pass filter to the hitch articulation angle and to the yaw rate.

Also in an exemplary embodiment, the mitigating of the trailer sway includes mitigating the trailer sway, via the instructions provided by the processor to the one or more braking systems of the vehicle-trailer system, when it is determined that the trailer sway of the trailer is sufficient to warrant mitigation based on an oscillation of the trailer sway, as represented via an oscillation signal of the one or more parameters, including a plurality of peak values of the oscillation signal.

Also in an exemplary embodiment, the mitigating of the trailer sway includes mitigating the trailer sway, via the instructions provided by the processor to the one or more braking systems of the vehicle-trailer system, when it is determined that the trailer sway of the trailer is sufficient to warrant mitigation based on a number of the plurality of peak values and respective magnitudes of the plurality of peak values of the oscillation signal.

Also in an exemplary embodiment, the mitigating of the trailer sway includes mitigating the trailer sway, via the instructions provided by the processor to a vehicle braking system of the vehicle for application of uniform or differential braking on a rear axle of the vehicle based on the application of the band-pass filter to the hitch articulation angle and the yaw rate.

Also in an exemplary embodiment, the mitigating of the trailer sway includes mitigating the trailer sway, via the instructions provided by the processor to a vehicle braking system of the vehicle for application of differential braking on a front axle of the vehicle based on the application of the band-pass filter to the hitch articulation angle and the yaw rate.

Also in an exemplary embodiment, the mitigating of the trailer sway includes mitigating the trailer sway, via the instructions provided by the processor to a trailer braking system of the trailer for application of a calculated uniform braking based on a driver trailer brake gain setting in addition to yaw-rate and hitch articulation angle.

In another exemplary embodiment, a system is provided that includes: one or more sensors and a processor. The one or more sensors are configured to provide sensor data from onboard a vehicle that is towing a trailer, the vehicle and trailer collectively including a vehicle-trailer system. The processor is configured to be coupled to the one or more sensors while onboard the vehicle, and is configured to at least facilitate: monitoring a trailer sway of the trailer using the sensor data, based on one or more parameters of the sensor data representing the trailer sway and application of a band-pass filter to the one or more parameters; and mitigating the trailer sway, via instructions provided by the processor to one or more braking systems of the vehicle-trailer system, when it is determined that the trailer sway of the trailer is sufficient to warrant mitigation based on the one or more parameters of the sensor data representing the trailer sway and the application of the band-pass filter to the one or more parameters.

Also in an exemplary embodiment, the processor is further configured to at least facilitate: monitoring the trailer sway of the trailer using the sensor data, based on a hitch articulation angle of the vehicle-trailer system and application of the band-pass filter to the hitch articulation angle; and mitigating the trailer sway, via the instructions provided by the processor to the one or more braking systems of the vehicle-trailer system, when it is determined that the trailer sway of the trailer is sufficient to warrant mitigation based on the hitch articulation angle and the application of the band-pass filter to the hitch articulation angle.

In another exemplary embodiment, a vehicle is provided that is configured to tow a trailer, the vehicle including a braking system, one or more sensors, and a processor. The one or more sensors are disposed onboard the vehicle and configured to provide sensor data. The processor is disposed onboard the vehicle, is coupled to the braking system and to the one or more sensors, and is configured to at least facilitate: monitoring a trailer sway of the trailer using the sensor data, based on one or more parameters of the sensor data representing the trailer sway and application of a band-pass filter to the one or more parameters; and mitigating the trailer sway, via instructions provided by the processor to one or more braking systems of the vehicle, the trailer, or both, when it is determined that the trailer sway of the trailer is sufficient to warrant mitigation based on the one or more parameters of the sensor data representing the trailer sway and the application of the band-pass filter to the one or more parameters.

Also in an exemplary embodiment, the processor is configured to at least facilitate: monitoring the trailer sway of the trailer using the sensor data, based on a hitch articulation angle of the vehicle, the trailer, or both and application of the band-pass filter to the hitch articulation angle; and mitigating the trailer sway, via the instructions provided by the processor to the one or more braking systems of the vehicle, the trailer, or both, when it is determined that the trailer sway of the trailer is sufficient to warrant mitigation based on the hitch articulation angle and the application of the band-pass filter to the hitch articulation angle.

Also in an exemplary embodiment, the processor is configured to at least facilitate: monitoring the trailer sway of the trailer using the sensor data, based on a yaw rate of the vehicle and application of the band-pass filter to the yaw rate; and mitigating the trailer sway, via the instructions provided by the processor to the one or more braking systems of the vehicle, the trailer, or both, when it is determined that the trailer sway of the trailer is sufficient to warrant mitigation based on the yaw rate and the application of the band-pass filter to the yaw rate.

Also in an exemplary embodiment, the processor is configured to at least facilitate: monitoring the trailer sway of the trailer using the sensor data, based on a hitch articulation angle of the vehicle, the trailer, or both and a yaw rate of the vehicle, along with an application of the band-pass filter to the hitch articulation angle and to the yaw rate; and mitigating the trailer sway, via the instructions provided by the processor to the one or more braking systems of the vehicle, the trailer, or both, when it is determined that the trailer sway of the trailer is sufficient to warrant mitigation based on the hitch articulation angle, the yaw rate, and the application of the band-pass filter to the hitch articulation angle and to the yaw rate.

Also in an exemplary embodiment, the processor is configured to at least facilitate mitigating the trailer sway, via the instructions provided by the processor to the one or more braking systems of the vehicle, the trailer, or both, when it is determined that the trailer sway of the trailer is sufficient to warrant mitigation based on an oscillation of the trailer sway, as represented via an oscillation signal of the one or more parameters, including a plurality of peak values of the oscillation signal.

Also in an exemplary embodiment, the processor is configured to at least facilitate mitigating the trailer sway, via the instructions provided by the processor to the one or more braking systems of the vehicle, the trailer, or both, when it is determined that the trailer sway of the trailer is sufficient to warrant mitigation based on a number of the plurality of peak values and respective magnitudes of the plurality of peak values of the oscillation signal.

Also in an exemplary embodiment, the processor is configured to at least facilitate mitigating the trailer sway, via the instructions provided by the processor to a vehicle braking system of the vehicle for application of uniform or differential braking on a rear axle of the vehicle based on the application of the band-pass filter to the hitch articulation angle and the yaw rate.

Also in an exemplary embodiment, the processor is configured to at least facilitate mitigating the trailer sway, via the instructions provided by the processor to a vehicle braking system of the vehicle for application of differential braking on a front axle of the vehicle based on the application of the band-pass filter to the hitch articulation angle and the yaw rate.

Also in an exemplary embodiment, the processor is configured to at least facilitate mitigating the trailer sway, via the instructions provided by the processor to a trailer braking system of the trailer for application of a calculated uniform braking based on a driver trailer brake gain setting in addition to yaw-rate and hitch articulation angle.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
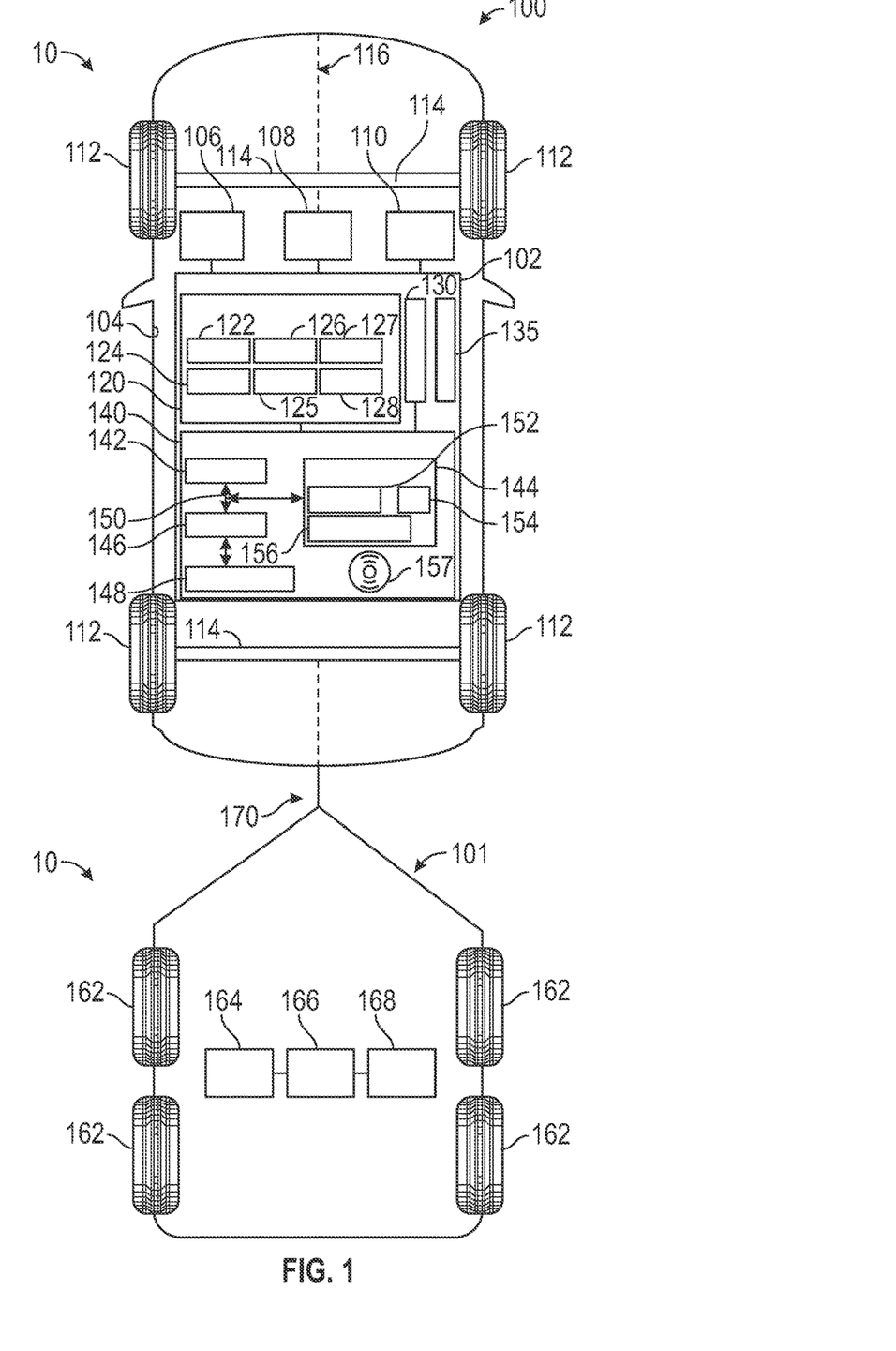
FIG. 1 is a functional block diagram of a vehicle/trailer system that includes a vehicle that is towing a trailer during travel, and in which the vehicle that includes a control system for controlling the vehicle and trailer during travel with respect to sway of the trailer, in accordance with exemplary embodiments.

FIG. 1 illustrates a travel system 10 (also referred to as a "system" or "vehicle/trailer system") 10, according to an exemplary embodiment. As depicted in FIG. 1, the travel system 10 includes a vehicle 100 and a trailer 101. In various embodiments, the vehicle 100 is coupled and connected to the trailer 101 via a connection apparatus 170, and is configured to tow a trailer 101. In certain embodiments, the connection apparatus 170 comprises a hitch. In certain other embodiments, the connection apparatus 170 comprises one or more other types of apparatus system, such as a gooseneck for a fifth wheel trailer, and so on.

As described in greater detail further below, the vehicle 100 includes a control system 102 for controlling operation and movement of the travel system 10, including with respect to sway of the trailer 101 during travel, in accordance with an exemplary embodiment.

In various embodiments, the vehicle 100 comprises an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, such as aircraft, spacecraft, watercraft, and so on, and/or one or more other types of mobile platforms (e.g., a robot and/or other mobile platform).

The vehicle 100 includes a body 104 that is arranged on a chassis 116. The body 104 substantially encloses other components of the vehicle 100. The body 104 and the chassis 116 may jointly form a frame. The vehicle 100 also includes a plurality of wheels 112. The wheels 112 are each rotationally coupled to the chassis 116 near a respective corner of the body 104 to facilitate movement of the vehicle 100. In one embodiment, the vehicle 100 includes four wheels 112, although this may vary in other embodiments (for example for trucks and certain other vehicles).

A drive system 110 is mounted on the chassis 116, and drives the wheels 112, for example via axles 114. The drive system 110 preferably comprises a propulsion system. In certain exemplary embodiments, the drive system 110 comprises an internal combustion engine and/or an electric motor/generator, coupled with a transmission thereof. In certain embodiments, the drive system 110 may vary, and/or two or more drive systems 110 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

As depicted in FIG. 1, the vehicle also includes a braking system 106 and a steering system 108 in various embodiments. In exemplary embodiments, the braking system 106 controls braking of the vehicle 100 using braking components that are controlled via inputs provided by a driver (e.g., via a braking pedal in certain embodiments) and/or automatically via the control system 102. Also in exemplary embodiments, the steering system 108 controls steering of the vehicle 100 via steering components (e.g., a steering column coupled to the axles 114 and/or the wheels 112) that are controlled via inputs provided by a driver (e.g., via a steering wheel in certain embodiments) as well as automatically via the control system 102. Also in various embodiments, the control system 102 provides automatic braking via the braking system 106 as appropriate to mitigate trailer sway for the trailer 101, in accordance with the steps of the process 200 of FIG. 2 and the implementations of FIGS. 3 and 4 and described further below.

In the embodiment depicted in FIG. 1, the control system 102 is coupled to the braking system 106, the steering system 108, and the drive system 110. Also as depicted in FIG. 1, in various embodiments, the control system 102 includes a sensor array 120, a location system 130, a display 135, and a controller 140.

In various embodiments, the sensor array 120 includes various sensors that obtain sensor data for controlling sway of the trailer 101. In the depicted embodiment, the sensor array 120 includes input sensors 122 (e.g., brake pedal sensors measuring brake inputs provided by a driver and/or touch screen sensors and/or other input sensors configured to received inputs from a driver or other user of the vehicle 100); trailer sensors 124 (e.g., configured to measure a hitch articulation angle with respect to the trailer 101, and/or in certain embodiments a weight of and/or other data pertaining to the trailer 101), speed sensors 125 (e.g., wheel speed sensors and/or other sensors configured to measure a speed and/or velocity of the vehicle and/or data used to calculate such speed and/or velocity), cameras 126 (in certain embodiments, configured to capture images of the lane and roadway in which the vehicle 100 is traveling, and in certain embodiments data pertaining to the trailer 101, such as a hitch angle at which the vehicle 100 is attached to the trailer 101 via the hitch 170), and acceleration sensors 127 (e.g., an accelerometer and/or one or more other sensors for measuring and/or determining an acceleration of the vehicle 100), and yaw sensors 128 (for measuring and/or determining a yaw rate of the vehicle 100). In various embodiments, various sensor data, including as to the hitch articulation angle and yaw rate, are used in monitoring and mitigating trailer sway for the trailer 101 in accordance with the steps of the process 200 of FIG. 2 and described further below.

In certain embodiments, the location system 130 is configured to obtain and/or generate data as to a position and/or location in which the vehicle is located and/or is traveling. In certain embodiments, the location system 130 comprises and/or or is coupled to a satellite-based network and/or system, such as a global positioning system (GPS) and/or other satellite-based system. Also in certain embodiments, the display system 135 provides visual, audio, haptic, and/or other information for a driver or user of the vehicle 100 via instructions provided by the controller 140, including pertaining to the trailer sway.

In various embodiments, the controller 140 is coupled to the sensor array 120 as well as to the braking system 106. In various embodiments, the controller 140 may also be coupled to one or more other vehicle components, such as the steering system 108, the drive system 110, the location system 130, the display 135, and/or other vehicle components.

In various embodiments, the controller 140 comprises a computer system (also referred to herein as computer system 140), and includes a processor 142, a memory 144, an interface 146, a storage device 148, and a computer bus 150. In various embodiments, the controller (or computer system) 140 controls vehicle and trailer operation, including monitoring and mitigation of trailer sway for the trailer 101. In various embodiments, the controller 140 provides these and other functions in accordance with the steps of the process of FIG. 2 and implementations described further below, for example in connection with FIGS. 3 and 4.

In various embodiments, the controller 140 (and, in certain embodiments, the control system 102 itself) is disposed within the body 104 of the vehicle 100. In one embodiment, the control system 102 is mounted on the chassis 116. In certain embodiments, the controller 140 and/or control system 102 and/or one or more components thereof may be disposed outside the body 104, for example on a remote server, in the cloud, or other device where processing is performed remotely.

It will be appreciated that the controller 140 may otherwise differ from the embodiment depicted in FIG. 1. For example, the controller 140 may be coupled to or may otherwise utilize one or more remote computer systems and/or other control systems, for example as part of one or more of the above-identified vehicle 100 devices and systems.

In the depicted embodiment, the computer system of the controller 140 includes a processor 142, a memory 144, an interface 146, a storage device 148, and a bus 150. The processor 142 performs the computation and control functions of the controller 140, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 152 contained within the memory 144 and, as such, controls the general operation of the controller 140 and the computer system of the controller 140, generally in executing the processes described herein, such as the process of FIG. 2 and implementations described further below, for example in connection with FIGS. 2 and 3.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted embodiment, the memory 144 stores the above-referenced program 152 along with map data 154 (e.g., from and/or used in connection with the location system 130) and one or more stored values 156 (e.g., including, in various embodiments, threshold values for time to crossing of lane markers for the vehicle and trailer).

The bus 150 serves to transmit programs, data, status and other information or signals between the various components of the computer system of the controller 140. The interface 146 allows communication to the computer system of the controller 140, for example from a system driver and/or another computer system, and can be implemented using any suitable method and apparatus. In one embodiment, the interface 146 obtains the various data from the sensor array 120 and/or the location system 130. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including various different types of direct access storage and/or other memory devices. In one exemplary embodiment, the storage device 148 comprises a program product from which memory 144 can receive a program 152 that executes one or more embodiments of one or more processes of the present disclosure, such as the steps of the process of FIG. 2 and implementations described further below, for example in connection with FIGS. 2 and 3. In another exemplary embodiment, the program product may be directly stored in and/or otherwise accessed by the memory 144 and/or a disk (e.g., disk 157), such as that referenced below.

The bus 150 can be any suitable physical or logical means of connecting computer systems and components. This includes, but is not limited to, direct hard-wired connections, fiber optics, infrared and wireless bus technologies. During operation, the program 152 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 140 may also otherwise differ from the embodiment depicted in FIG. 1, for example in that the computer system of the controller 140 may be coupled to or may otherwise utilize one or more remote computer systems and/or other control systems.

As depicted in FIG. 1, in certain embodiments, the trailer 101 also includes a plurality of wheels 162, as well as one or more sensors 164, a control system 166, and/or a braking system 168. In certain embodiments, sensors 164 of the trailer 101 may provide sensor data pertaining to the trailer 101 (e.g. a hitch articulation angle, a mass, and/or weight thereof), for example similar to the trailer sensors 124 of FIG. 1. Also in certain embodiments, the control system 166 of the trailer may include a processor and provide certain functions described in connection with the controller 140 of the vehicle 100. In addition, in certain embodiments, the braking system 168 may provide braking for the trailer 101, for example in accordance with instructions provided by the controller 140 of the vehicle 100 (and/or, in certain embodiments, via the control system 166 of the trailer 101), including for mitigating trailer sway for the trailer 101.

Figure 2:
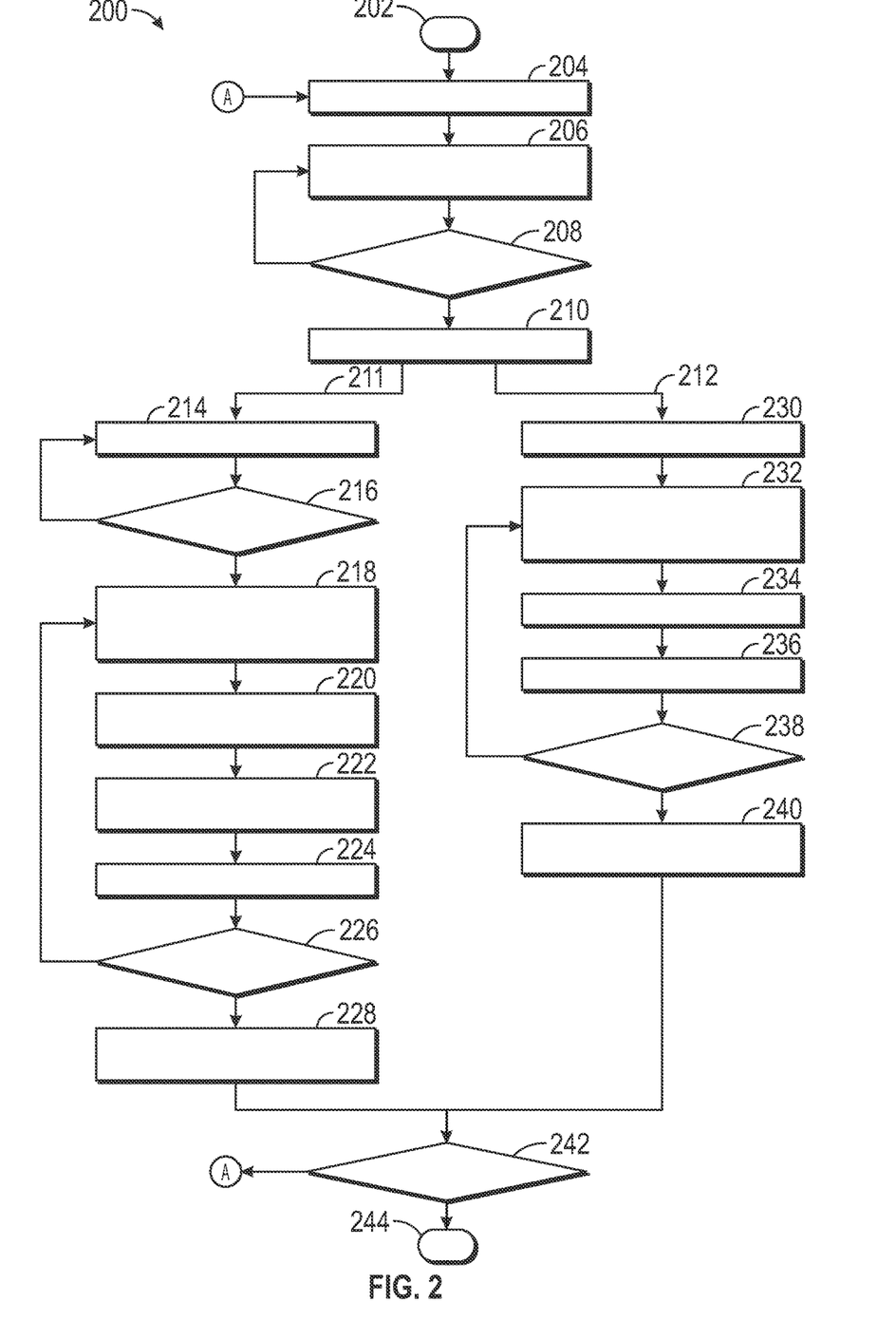
FIG. 2 is a flowchart of a process for controlling a vehicle and trailer system with respect to sway of the trailer, and that can be implemented in connection with the system of FIG. 1, including the vehicle and the trailer thereof, in accordance with exemplary embodiments.

FIG. 2 is a flowchart of a process 200 for controlling a vehicle and trailer system with respect to sway of the trailer, in accordance with exemplary embodiments. In various embodiments, the process 200 can be implemented in connection with the system 10 of FIG. 1, including the vehicle 100 and the trailer 101 thereof.

Figure 3:
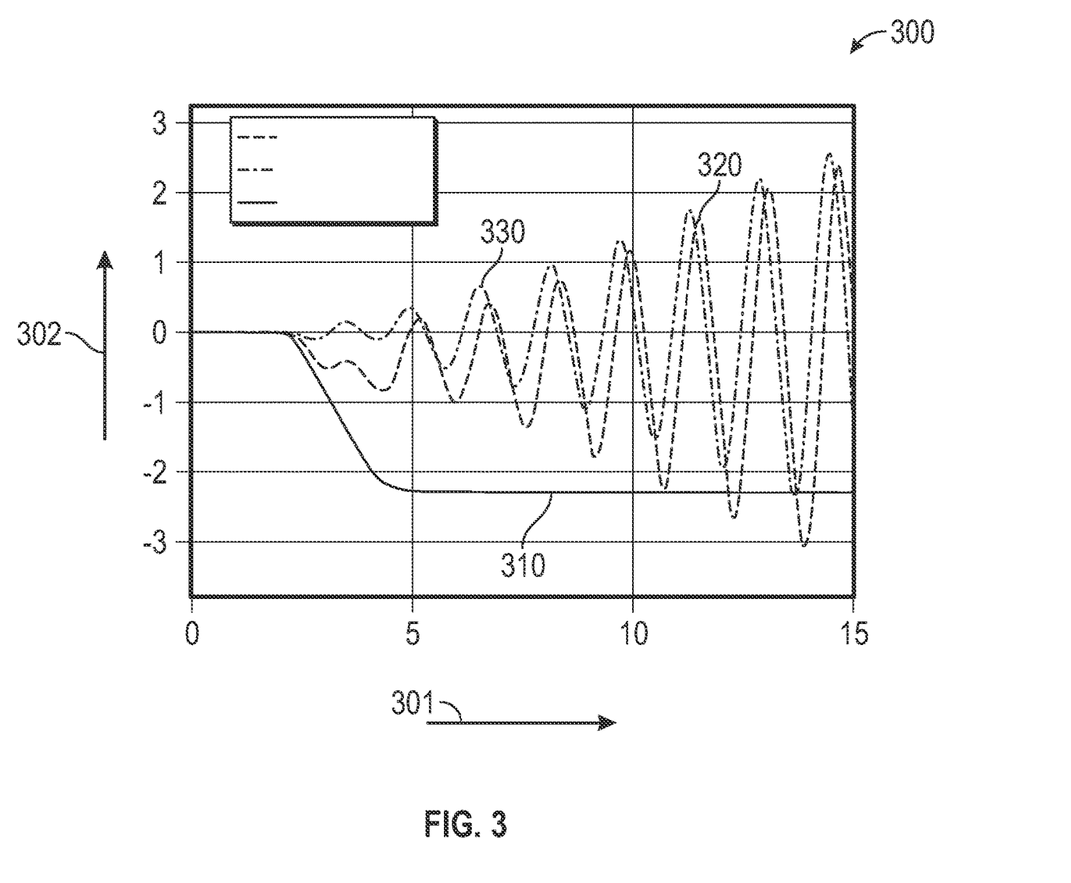
FIG. 3 is a graphical representation of certain steps of the process of FIG. 2, including the monitoring of trailer sway using a band-pass filter, that can be implemented in connection with the system of FIG. 1, including the vehicle and the trailer thereof, in accordance with exemplary embodiments.
Figure 4:
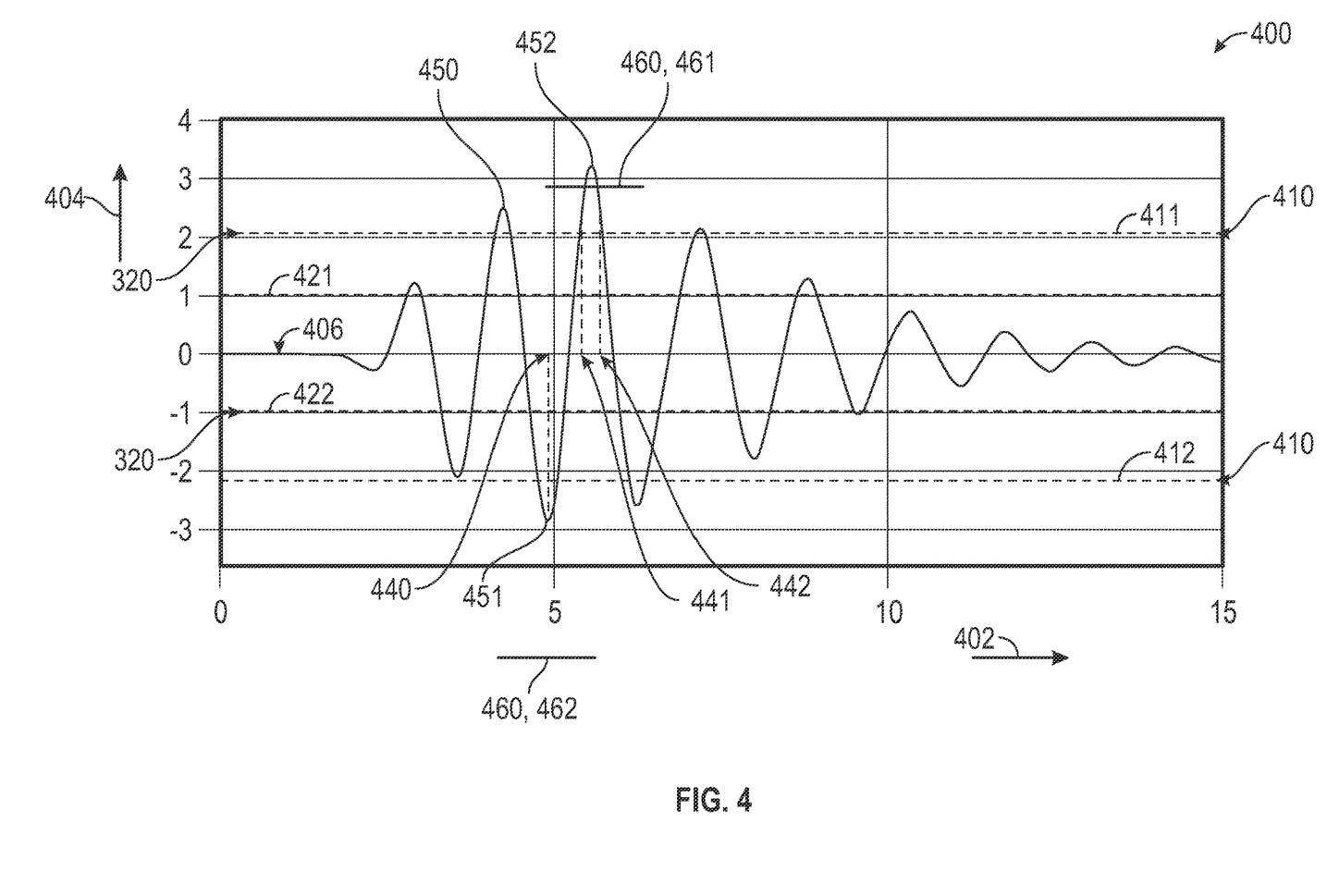
FIG. 4 is a graphical representation of an implementation of certain steps of the process of FIG. 2, including the determining of whether sufficient sway is present with the trailer warranting mitigation, that can be implemented in connection with the system of FIG. 1, including the vehicle and the trailer thereof, in accordance with exemplary embodiments.

The process 200 will also be described in connection with exemplary implementations of FIGS. 3 and 4. Specifically: (i) FIG. 3 is a graphical representation of certain steps of the process 200 of FIG. 2, including the monitoring of trailer sway using a band-pass filter; and (ii) FIG. 4 is a graphical representation of an implementation of certain steps of the process 200 of FIG. 2, including the determining of whether sufficient sway is present with the trailer warranting mitigation, in accordance with exemplary embodiments.

As depicted in FIG. 2, the process 200 begins at step 202. In one embodiment, the process 200 begins when a vehicle drive or ignition cycle begins, for example when a driver approaches or enters the vehicle 100, or when the driver turns on the vehicle and/or an ignition therefor (e.g. by turning a key, engaging a keyfob or start button, and so on), while the vehicle 100 is coupled to the trailer 101. In one embodiment, the steps of the process 200 are performed continuously during operation of the vehicle.

In various embodiments, sensor data is obtained (step 204). In various embodiments, various sensor data as to the vehicle 100 and the trailer 101 are obtained via sensors of the sensor array 120 of FIG. 1. In certain embodiments, sensor data may also be obtained via trailer sensors 164 of the trailer 101. In various embodiments, the sensor data includes a hitch articulation angle with respect to the trailer 101 (e.g., for the hitch 170) as well as a yaw rate for the vehicle 100. In various embodiments, various other sensor data may also be obtained, such as by way of example, inputs from a driver or other user, camera data as to the system 10 and/or roadway on which it is traveling, acceleration of the vehicle 100 and/or trailer 101, mass, weight, and/or other measurements of the vehicle 100 and/or trailer 101, speeds and/or accelerations of the vehicle 100 and/or trailer 101, and so on. In various embodiments, the sensor data of step 204 is provided to the processor 142 of FIG. 1 for processing, and for making determinations and implementations for the remaining steps of the process 200, including for monitoring and mitigation of trailer sway for the trailer 101, for example as described below.

In various embodiments, trailer sway is monitored for the trailer (step 206). Specifically, in various embodiments, the processor 142 of FIG. 1 monitors sway of the trailer 101 using the sensor data obtained from the sensor array 120 of FIG. 1 in step 204. In various embodiments, the trailer sway is monitored using a hitch articulation angle with respect to the trailer 101 as well as the yaw rate for the vehicle 100. In certain embodiments, other sensor data from step 204 may also be utilized in monitoring the trailer sway.

In various embodiments, the monitoring uses a band-pass filter for hitch articulation angle (HAA) and/or a band-pass filter for yaw rate to eliminate low frequency content (e.g., bias in the signal) due to driver steering input. In certain embodiments, the monitoring uses band-pass filtering for both the hitch articulation angle and the yaw rate. In certain other embodiments, the monitoring may use band-pass filtering for one of hitch articulation angle or yaw rate. In various embodiments, the monitoring algorithm does not need any kinematic/dynamic models, and no other trailer parameters.

In certain embodiments, the monitoring algorithm determines trailer sway oscillation based on the Yaw Rate and HAA inputs to be used in determination of required brake control input(s) for corresponding wheel(s), in accordance with the following equation:

$$x_f = \frac{a_0 + a_1 z^{-1} + a_2 z^{-2}}{b_0 + b_1 z^{-1} + b_2 z^{-2}} x, \quad \text{(Equation 1)}$$

in which the coefficients $a_i$, $b_i$ are selected for cut-off frequencies between a predetermined range. In one embodiment, the predetermined range is between 0.4 Hz and 2.0 Hz. However, this may vary in other embodiments, and the predetermined range may be calibratable. x is the raw signal measured by the sensor, $x_f$ is the band-pass filtered signal.

With reference to FIG. 3, graphical representation 300 is provided illustrating the monitoring of step 206 of the oscillation of the trailer 101 via hitch articulation angle. In FIG. 3, the x-axis 301 represents time (in seconds) and the y-axis 302 represents hitch articulation (HAA) (in degrees). Three signals are depicted in FIG. 3, namely: (i) initial estimates of HAA 310 based on a given strict angle and vehicle systems; (ii) measured HAA 320 coming from vehicle sensors; and (iii) filtered HAA values 330 over time using a band-pass filter. In various embodiments, the filtered HAA values 330 use a band-pass filter, and help to eliminate bias, to therefore all for the process to check the health of the sensors over time and to measure the peak values and see changes in the peak over time. In various embodiments, this serves as an approximation for trailer sway.

With reference back to FIG. 2, in various embodiments, a determination is made as to whether sufficient trailer sway is identified such as to warrant mitigation (step 208). In various embodiments, this determination is made by the processor 142 of FIG. 1 based on the sensor data of step 204 and the monitoring of step 206. Also in various embodiments, this determination is based on a detected oscillation of parameters (including hitch articulation angle and/or yaw rate) that are representative of trailer sway in a model utilized in the process 200, and in particular whether such oscillation includes certain peaks that exceed one or more predetermined thresholds, for example as described below with respect to the exemplary implementation depicted in FIG. 4.

With reference to FIG. 4, a graphical representation 400 is provided with respect to the monitoring of the trailer sway of step 206 and the determination of step 208 as to whether the sufficient sway is present with the trailer warranting mitigation, in accordance with exemplary embodiments. In accordance with an exemplary embodiment, the graphical representation 400 includes an x-axis 402 that represents time (e.g., in seconds), and y-axis 404 that represents one or more trailer sway parameters including hitch articulation angle and/or yaw rate (e.g., in degrees and/or degrees per millisecond, respectively).

As depicted in FIG. 4, an oscillation signal 406 is provided with respect to the one or more trailer sway parameters (e.g., including articulation angle and/or yaw rate). In various embodiments, peaks in the oscillation signal 406 are determined based on when the oscillation signal exits boundaries established by entrance thresholds 410.

Specifically, in certain embodiments, a peak in the oscillation signal 406 is determined when the oscillation signal is greater than a first entrance threshold ($T_1$) 411 or less than a second entrance threshold ($T_2$) 412, wherein the second entrance threshold ($T_2$) 412 is less than the first entrance threshold ($T_1$) 411. For example, in the implementation of FIG. 4: (i) a first peak $Pk_1$ 450 is identified when the oscillation signal 406 first exceeds the first entrance threshold ($T_1$) 411; (ii) a second peak $Pk_2$ 451 is identified when the oscillation signal 406 is first less than the second entrance threshold ($T_2$) 412; and (iii) a third peak $Pk_3$ 452 is identified the next time the oscillation signal 406 is greater than the first entrance threshold ($T_1$) 411. As described in greater detail further, trailer sway mitigation is considered for implementation when the oscillation signal 406 is greater than the first entrance threshold ($T_1$) 411 or less than the second entrance threshold ($T_2$) 412.

Also in certain embodiments, the peaks in the oscillation signal 406 are no longer considered for trailer sway mitigation when the oscillation signal is both less than a first exit threshold ($T_3$) 421 and greater than a second exit threshold ($T_4$) 422. As illustrated in FIG. 4, in various embodiments: (i) the first exit threshold ($T_3$) 421 is less than the first entrance threshold ($T_1$) 411; (ii) the second exit threshold ($T_4$) 422 is less than the first exit threshold ($T_3$) 421; and (iii) the second entrance threshold ($T_2$) 412 is less than the second exit threshold ($T_4$) 422. In one exemplary embodiment, the following threshold values may be utilized: $T_1=2$; $T_2=-2$; $T_3=1$, and $T_4=-1$; however, this may vary in other embodiments.

Also as depicted in FIG. 4, in certain embodiments trailer sway mitigation thresholds 460 are utilized for implementing trailer sway mitigation strategies for the vehicle-trailer system. As depicted in FIG. 4, in certain embodiments, a lower mitigation threshold ($T_5$) 462 and an upper mitigation threshold ($T_6$) 461 are both utilized. In various embodiments, trailer sway mitigation is implemented when the oscillation signal 406 is less than the lower mitigation threshold ($T_5$) 462 or greater than the upper mitigation threshold ($T_6$) 461. Also in various embodiments, the lower mitigation threshold 462 and the upper mitigation threshold 461 are both based on prior peak values for the oscillation signal 406.

Specifically, in certain embodiments, the lower mitigation threshold ($T_5$) 462 is calculated in accordance with the following equation:

$$T_5 = K_1 * |Pk_1| \quad \text{(Equation 2)},$$

in which $K_1$ represents a predetermined constant and $Pk_1$ represents the first peak 450. In one exemplary embodiment, the value of $K_1$ is equal to 1.2; however, this may vary in other embodiments.

Also in certain embodiments, the upper mitigation threshold ($T_6$) 461 is calculated in accordance with the following equation:

$$T_6 = K_2 * |Pk_2| \quad \text{(Equation 3)},$$

in which $K_2$ represents a predetermined constant and $Pk_2$ represents the second peak 451. In one exemplary embodiment, the value of $K_2$ is equal to 0.9; however, this may vary in other embodiments.

Also in various embodiments, the trailer sway mitigation implementation begins when the magnitude of the oscillation signal 406 is (i) either less than the lower mitigation threshold ($T_6$) 462 or greater than the upper mitigation threshold ($T_5$) 461, provided further that (ii) at least one peak (or in certain embodiments, at least two peaks) of the magnitude of the oscillation signal 406 surpass absolute values of one or both of the first entrance threshold 411 or the second entrance threshold 412. In addition, in certain embodiments, the trailer sway mitigation is terminated when the oscillation signal 406 has a peak that is either less than the first exit threshold 421 or greater than the second exit threshold 412.

In various implementations, the trailer sway mitigation is implemented with two different embodiments, as described below.

In a first embodiment, the process establishes a trailer sway detection rising threshold trigger for the last ($N^{th}$) peak. In this embodiment, trailer sway is detected at the time when the sway signal of the $N^{th}$ peak ($Pk_N$) exceeds a calibration value multiplied by the sway signal of the N-1 peak ($K_2 * Pk_{N-1}$). This enables the algorithm to determine at time $t_1$ 441 instead of at time $t_2$ 442. In various embodiments, this would enable the control algorithm to apply brakes earlier ($t_2-t_1$) to improve sway control.

In a second embodiment, the process establishes sway detection based on sway growth (instability criteria) that is based on the ratio of $Pk_{N-1}/Pk_{N-2}$. In this embodiment, if this ratio exceeds a threshold ($K_1 * Pk_{N-2}$), the algorithm will detect trailer sway at time $t_0$ 440 (rising edge) of FIG. 4 instead of at time $t_1$ 441, further improving the time to detect and improve the controllability of larger trailer sway instabilities. It is noted that in various embodiments time $t_0$ 440 does not have to align with $Pk_{N-1}$. For example, in certain embodiments, time $t_0$ 440 could be earlier than the true peak value (e.g., if a threshold is crossed).

With reference back to FIG. 2, if it is determined in step 208 that sufficient trailer sway has not been identified such as to warrant mitigation, then the process returns to step 206 in a new iteration. Steps 206 and 208 continue in this manner in new iterations (e.g., with updated sensor data) until a determination is made in a subsequent iteration of step 208 that sufficient trailer sway is identified such as to warrant mitigation. In various embodiments, once it is determined in an iteration of step 208 that sufficient trailer sway is identified such as to warrant mitigation, then the process proceeds to step 210, described below.

During step 210, trailer sway mitigation implementation begins. In various embodiments, the trailer sway mitigation is initiated via instructions provided by the processor 142 of FIG. 1 with respect to systems of the vehicle 100 and/or the trailer 101 of FIG. 1, for example as described in greater detail below. In various embodiments, the trailer sway mitigation is implemented via one or both of a vehicle control path 211 and/or a trailer control path 212, for example as illustrated in FIG. 2 and described below. In certain embodiments, the trailer sway mitigation is implemented via both the vehicle control path 211 and the trailer control path 212 (e.g., simultaneously, in certain embodiments, or at different times in other embodiments). In certain other embodiments, the trailer sway mitigation is implemented via one of the vehicle control path 211 or the trailer control path 212, but not the other.

With reference first to the vehicle control path 211, in various embodiments, the hitch articulation angle and the yaw rate are observed with respective zero crossings (step 214). Specifically, in various embodiments, the hitch articulation angle and/or yaw rate components of the oscillation signal 406 of FIG. 4 are observed as crossing respective zero values along the x-axis in FIG. 4. In other words, in various embodiments, these values (representing trailer sway) are observed to be oscillating during step 214. In certain embodiments, the process remains in step 214 until such zero crossing values (i.e., representing oscillation of trailer sway) are observed for at least one of the hitch articulation angle and/or yaw rate, after which the process proceeds to step 216, described below.

In various embodiments, during step 216, a determination is made as to whether either: (i) an absolute value of the hitch articulation angle (HAA) is greater than the first entrance threshold ($T_1$) 411 of FIG. 4 or (ii) the absolute value of the yaw rate is greater than the second entrance threshold ($T_2$) 412 of FIG. 4. In various embodiments, if neither of these conditions are satisfied, the process returns to step 214, and steps 214 and 216 repeat in subsequent iterations until at least one of these conditions are satisfied. Also in various embodiments, once one or both of these conditions are satisfied, the process then proceeds to step 218, described below.

In various embodiments, during step 218, a band-pass filter is applied. Specifically, in various embodiments, during step 218, the processor 142 of FIG. 1 applies a band-pass filter to the hitch articulation angle and yaw rate values. In certain embodiments, a band-pass filter may be applied to other parameter values that may also influence trailer sway mitigation, such as such as velocity, longitudinal acceleration, and/or other parameters for the vehicle and/or trailer. In various embodiments, the filtered values may be utilized in calculating and applying uniform braking (in step 220) or differential braking (in step 222), as described below.

In various embodiments, uniform braking is calculated and applied (step 220). In various embodiments, values for automatic uniform braking are calculated by the processor 142 and applied to the rear wheels of FIG. 1 (i.e., the wheels 112 on the rear axle 114 of FIG. 1) based on the vehicle velocity and vehicle longitudinal values (after application of the band-pass filter). In certain other embodiments, differential braking may instead be applied to the rear axles 114 of FIG. 1. In various embodiments, the uniform and/or differential braking is performed via the rear wheels 112 of FIG. 1 via instructions provided by the processor 142 of FIG. 1 to the braking system 106 of the vehicle 100 of FIG. 1.

In various other embodiments, differential uniform braking is calculated and applied (step 222). In various embodiments, values for automatic differential braking are calculated by the processor 142 and applied to the front wheels of FIG. 1 (i.e., the wheels 112 on the front axle 114 of FIG. 1) (and in certain embodiments also the rear wheels of FIG. 1) in accordance with the following equation:

$$T_{diffbrk} = K_5(a_x)[K_3(v_x, W_{zfpeak})^* K_4(v_x, HAA_{fpeak})^* HAA_f] \quad \text{(Equation 4)},$$

in which $K_3$ and $K_4$ are look-up table gains based on longitudinal velocity, yaw rate peak or HAA peak value when sway is detected, respectively, and $K_5$ represents a look-up table gain based on longitudinal deceleration. In various embodiments, the uniform braking is performed via the rear wheels 112 of FIG. 1 via instructions provided by the processor 142 of FIG. 1 to the braking system 106 of the vehicle 100 of FIG. 1. In certain embodiments, when uniform braking is automatically provided on the vehicle, it is used conjunction with an automatic application of differential braking or uniform braking on the trailer.

Also in various embodiments, absolute values of peak values are determined for both the hitch articulation angle (HAA) and yaw rate ($W_z$) (step 224). In various embodiments, these determinations are made by the processor 142 of FIG. 1 based on the sensor data.

In various embodiments, during step 226, a determination is made as to whether both of the following conditions are satisfied; namely, that: (i) the absolute peak value of the filtered hitch articulation angle (i.e., $|HAA_{fpeak}|$) is less than the first exit threshold $T_3$ 421 of FIG. 4; and (ii) the absolute peak value of the filtered yaw rate (i.e., $|W_{zfpeak}|$) is less than the second exit threshold $T_4$ 421 of FIG. 4. In various embodiments, these determinations are made by the processor 142 of FIG. 1 based on the sensor data.

In various embodiments, if it is determined that both criteria of step 226 are satisfied, then the process proceeds to step 228, in which vehicle based trailer sway control is disabled. Specifically, in various embodiments, during step 228, the processor 142 of FIG. 1 provides instructions to the braking system 106 of FIG. 1 to disable the vehicle based trailer sway control. In various embodiments, the process then proceeds to step 242 (discussed further below) in which a determination is made as to whether the process to continue.

Conversely, if it is instead determined that one or both of the criteria of step 226 are not satisfied, then the process proceeds instead to step 218. In various embodiments, steps 218-228 thereafter repeat in new iterations until both of the conditions of step 226 are satisfied.

With reference back to step 210, and with specific reference to the trailer control path 212 thereof, in various embodiments trailer based sway control is initiated (step 230). In various embodiments, the trailer based sway control is initiated without reference to zero crossings of the hitch articulation angle or yaw rate.

Also in various embodiments, during step 232, a band-pass filter is applied. Specifically, in various embodiments, during step 232, the processor 142 of FIG. 1 applies a band-pass filter to the hitch articulation angle and yaw rate values. In certain embodiments, a band-pass filter may be applied to other parameter values that may also influence trailer sway mitigation, such as such as trailer brake gain steering, velocity, longitudinal acceleration, and/or other parameters for the vehicle and/or trailer. In various embodiments, the filtered values may be utilized in calculating and applying trailer braking as described further below in connection with step 234.

In various embodiments, trailer braking is applied (step 234). In various embodiments, values for automatic trailer braking are calculated by the processor 142 and applied to the wheels 162 of the trailer 101 based on longitudinal acceleration, driver trailer brake gain setting, velocity, HAA, and HAA peak magnitude. Also in certain embodiments, trailer brake application is mapped from existing Trailer Brake Gain Settings to account for the additional lateral slip on the trailer tires. In addition, in various embodiments, the longitudinal deceleration is maintained unless the disabling criteria are met.

In certain embodiments, the automatic trailer braking of step 234 is calculated and applied in accordance with the following equation:

$$T_{brk} = K_6(HAA_{fpeak})^* K_7^* C_2 \quad \text{(Equation 5)},$$

in which $K_7$ represents the trailer brake gain as set by the driver; $C_2$ represents the increment constant for the trailer brake; $K_6$ has values of zero or one representing adaptive brake gain depending on $HAA_{fpeak}$ and trailer wheelbase (when applicable). In various embodiments, the uniform braking is performed via the trailer wheels 162 of FIG. 1 via instructions provided by the processor 142 of FIG. 1 to the braking system 168 of the trailer 101 of FIG. 1.

In various embodiments, as part of step 234, the process mitigates the trailer sway, via the instructions provided by the processor to the trailer braking system of the trailer, for application of a calculated uniform braking based on a driver trailer brake gain setting in addition to yaw-rate and hitch articulation angle.

Also in various embodiments, absolute values of peak values are determined for both the hitch articulation angle (HAA) and yaw rate ($W_z$) (step 236). In various embodiments, these determinations are made by the processor 142 of FIG. 1 based on the sensor data, similar to step 224 described above.

In various embodiments, during step 238, a determination is made as to whether both of the following conditions are satisfied; namely, that: (i) the absolute peak value of the filtered hitch articulation angle (i.e., $|HAA_{fpeak}|$) is less than the first exit threshold $T_3$ 421 of FIG. 4; and (ii) the absolute value of the yaw rate (i.e., $|W_{zfpeak}|$) is less than the second exit threshold $T_4$ 421 of FIG. 4. In various embodiments, these determinations are made by the processor 142 of FIG. 1 based on the sensor data, also similar to step 226 described above.

In various embodiments, if it is determined that both criteria of step 238 are satisfied, then the process proceeds to step 240, in which trailer based trailer sway control is disabled. Specifically, in various embodiments, during step 240, the processor 142 of FIG. 1 provides instructions to the trailer braking system 168 of FIG. 1 to disable the trailer based trailer sway control. In various embodiments, the process then proceeds to step 240 (discussed below) in which a determination is made as to whether the process to continue.

Conversely, if it is instead determined that one or both of the criteria of step 226 are not satisfied, then the process proceeds instead to step 232. In various embodiments, steps 232-238 thereafter repeat in new iterations until both of the conditions of step 238 are satisfied.

In various embodiments, during step 242, a determination is made as to whether the process is to continue. In certain embodiments, the processor 142 of FIG. 1 determines whether the process is to continue, for example based upon whether a vehicle drive or ignition cycle is ongoing. In various embodiments, if it is determined during step 242 that the process is to continue, then the process returns to step 204, as updated sensor data is collected and utilized in a new iteration. Conversely, in various embodiments, if it is instead determined during step 242 that the process is not to continue, then the process terminates at step 244.

Accordingly, methods, systems, and vehicles are provided for mitigation of trailer sway in vehicle/trailer systems. In various embodiments, a band-pass filter is applied to hitch articulation angle and vehicle yaw rate in order to mitigate trailer sway under appropriate circumstances. In various embodiments, this can help lead to quicker detection of trailer sway, and can also therefore result in potentially larger trailer loads in various embodiments.

It will be appreciated that the systems, vehicles, and methods may vary from those depicted in the Figures and described herein. For example, the vehicle 100 and/or trailer 101 of FIG. 1, the control system 102 and/or components thereof of FIG. 1 may vary in different embodiments. It will similarly be appreciated that the steps of the process 200 may differ from those depicted in FIG. 2, and/or that various steps of the process 200 may occur concurrently and/or in a different order than that depicted in FIG. 2. It will similarly be appreciated that the various implementations of FIGS. 3 and 4 may also differ in various embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:
   obtaining sensor data from one or more sensors onboard a vehicle that is towing a trailer, the vehicle and trailer collectively comprising a vehicle-trailer system;
   monitoring, via a processor disposed onboard the vehicle, a trailer sway of the trailer using the sensor data, based on one or more parameters of the sensor data representing the trailer sway and application of a band-pass filter to the one or more parameters; and
   mitigating the trailer sway, via instructions provided by the processor to one or more braking systems of the vehicle-trailer system, when it is determined that the trailer sway of the trailer is sufficient to warrant mitigation based on the one or more parameters of the sensor data representing the trailer sway and the application of the band-pass filter to the one or more parameters, wherein:
   the monitoring comprises monitoring, via the processor onboard the vehicle, the trailer sway of the trailer using the sensor data, based on a hitch articulation angle of the vehicle-trailer system and a yaw rate of the vehicle, along with an application of the band-pass filter to the hitch articulation angle and to the yaw rate;
   the mitigating comprises mitigating the trailer sway, via the instructions provided by the processor to the one or more braking systems of the vehicle-trailer system, when it is determined that the trailer sway of the trailer is sufficient to warrant mitigation based on the hitch articulation angle, the yaw rate, and the application of the band-pass filter to the hitch articulation angle and to the yaw rate; and
   the mitigating of the trailer sway further comprises mitigating the trailer sway, via the instructions provided by the processor to a trailer braking system of the trailer for application of a calculated uniform braking based on a driver trailer brake gain setting in addition to yaw-rate and hitch articulation angle.

2. The method of claim 1, wherein:
   the monitoring further comprises monitoring, via the processor onboard the vehicle, the trailer sway of the trailer using the sensor data, based on the hitch articulation angle of the vehicle-trailer system and application of the band-pass filter to the hitch articulation angle; and
   the mitigating further comprises mitigating the trailer sway, via the instructions provided by the processor to the one or more braking systems of the vehicle-trailer system, when it is determined that the trailer sway of the trailer is sufficient to warrant mitigation based on the hitch articulation angle and the application of the band-pass filter to the hitch articulation angle.

3. The method of claim 1, wherein:
   the monitoring further comprises monitoring, via the processor onboard the vehicle, the trailer sway of the trailer using the sensor data, based on the yaw rate of the vehicle and application of the band-pass filter to the yaw rate; and
   the mitigating further comprises mitigating the trailer sway, via the instructions provided by the processor to the one or more braking systems of the vehicle-trailer system, when it is determined that the trailer sway of the trailer is sufficient to warrant mitigation based on the yaw rate and the application of the band-pass filter to the yaw rate.

4. The method of claim 1, wherein the mitigating of the trailer sway further comprises mitigating the trailer sway, via the instructions provided by the processor to the one or more braking systems of the vehicle-trailer system, when it is determined that the trailer sway of the trailer is sufficient to warrant mitigation based on an oscillation of the trailer sway, as represented via an oscillation signal of the one or more parameters, including a plurality of peak values of the oscillation signal.

5. The method of claim 4, wherein the mitigating of the trailer sway further comprises mitigating the trailer sway, via the instructions provided by the processor to the one or more braking systems of the vehicle-trailer system, when it is determined that the trailer sway of the trailer is sufficient to warrant mitigation based on a number of the plurality of peak values and respective magnitudes of the plurality of peak values of the oscillation signal.

6. The method of claim 1, wherein the mitigating of the trailer sway further comprises mitigating the trailer sway, via the instructions provided by the processor to a vehicle braking system of the vehicle for application of uniform or differential braking on a rear axle of the vehicle based on the application of the band-pass filter to the hitch articulation angle and the yaw rate.

7. The method of claim 1, wherein the mitigating of the trailer sway further comprises mitigating the trailer sway, via the instructions provided by the processor to a vehicle braking system of the vehicle for application of differential braking on a front axle of the vehicle based on the application of the band-pass filter to the hitch articulation angle and the yaw rate.

8. A system comprising:
one or more sensors configured to provide sensor data from onboard a vehicle that is towing a trailer, the vehicle and trailer collectively comprising a vehicle-trailer system; and
a processor configured to be coupled to the one or more sensors while onboard the vehicle and configured to at least facilitate:
monitoring a trailer sway of the trailer using the sensor data, based on one or more parameters of the sensor data representing the trailer sway and application of a band-pass filter to the one or more parameters; and
mitigating the trailer sway, via instructions provided by the processor to one or more braking systems of the vehicle-trailer system, when it is determined that the trailer sway of the trailer is sufficient to warrant mitigation based on the one or more parameters of the sensor data representing the trailer sway and the application of the band-pass filter to the one or more parameters, wherein the processor is further configured to at least facilitate:
monitoring the trailer sway of the trailer using the sensor data, based on a hitch articulation angle of the vehicle, the trailer, or both and a yaw rate of the vehicle, along with an application of the band-pass filter to the hitch articulation angle and to the yaw rate;
mitigating the trailer sway, via the instructions provided by the processor to the one or more braking systems of the vehicle, the trailer, or both, when it is determined that the trailer sway of the trailer is sufficient to warrant mitigation based on the hitch articulation angle, the yaw rate, and the application of the band-pass filter to the hitch articulation angle and to the yaw rate; and
mitigating the trailer sway, via the instructions provided by the processor to a trailer braking system of the trailer for application of a calculated uniform braking based on a driver trailer brake gain setting in addition to yaw-rate and hitch articulation angle.

9. The system of claim 8, wherein the processor is further configured to at least facilitate:
monitoring the trailer sway of the trailer using the sensor data, based on a hitch articulation angle of the vehicle-trailer system and application of the band-pass filter to the hitch articulation angle; and
mitigating the trailer sway, via the instructions provided by the processor to the one or more braking systems of the vehicle-trailer system, when it is determined that the trailer sway of the trailer is sufficient to warrant mitigation based on the hitch articulation angle and the application of the band-pass filter to the hitch articulation angle.

10. A vehicle configured to tow a trailer, the vehicle comprising:
a braking system;
one or more sensors disposed onboard the vehicle and configured to provide sensor data; and
a processor disposed onboard the vehicle, the processor coupled to the braking system and to the one or more sensors, and configured to at least facilitate:
monitoring a trailer sway of the trailer using the sensor data, based on one or more parameters of the sensor data representing the trailer sway and application of a band-pass filter to the one or more parameters; and
mitigating the trailer sway, via instructions provided by the processor to one or more braking systems of the vehicle, the trailer, or both, when it is determined that the trailer sway of the trailer is sufficient to warrant mitigation based on the one or more parameters of the sensor data representing the trailer sway and the application of the band-pass filter to the one or more parameters, wherein the processor is further configured to at least facilitate:
monitoring the trailer sway of the trailer using the sensor data, based on a hitch articulation angle of the vehicle, the trailer, or both and a yaw rate of the vehicle, along with an application of the band-pass filter to the hitch articulation angle and to the yaw rate:
mitigating the trailer sway, via the instructions provided by the processor to the one or more braking systems of the vehicle, the trailer, or both, when it is determined that the trailer sway of the trailer is sufficient to warrant mitigation based on the hitch articulation angle, the yaw rate, and the application of the band-pass filter to the hitch articulation angle and to the yaw rate; and
mitigating the trailer sway, via the instructions provided by the processor to a trailer braking system of the trailer for application of a calculated uniform braking based on a driver trailer brake gain setting in addition to yaw-rate and hitch articulation angle.

11. The vehicle of claim 10, wherein the processor is configured to at least facilitate:
monitoring the trailer sway of the trailer using the sensor data, based on a hitch articulation angle of the vehicle, the trailer, or both and application of the band-pass filter to the hitch articulation angle; and
mitigating the trailer sway, via the instructions provided by the processor to the one or more braking systems of the vehicle, the trailer, or both, when it is determined that the trailer sway of the trailer is sufficient to warrant mitigation based on the hitch articulation angle and the application of the band-pass filter to the hitch articulation angle.

12. The vehicle of claim 10, wherein the processor is further configured to at least facilitate:
  monitoring the trailer sway of the trailer using the sensor data, based on a yaw rate of the vehicle and application of the band-pass filter to the yaw rate; and
  mitigating the trailer sway, via the instructions provided by the processor to the one or more braking systems of the vehicle, the trailer, or both, when it is determined that the trailer sway of the trailer is sufficient to warrant mitigation based on the yaw rate and the application of the band-pass filter to the yaw rate.

13. The vehicle of claim 10, wherein the processor is further configured to at least facilitate mitigating the trailer sway, via the instructions provided by the processor to the one or more braking systems of the vehicle, the trailer, or both, when it is determined that the trailer sway of the trailer is sufficient to warrant mitigation based on an oscillation of the trailer sway, as represented via an oscillation signal of the one or more parameters, including a plurality of peak values of the oscillation signal.

14. The vehicle of claim 13, wherein the processor is further configured to at least facilitate mitigating the trailer sway, via the instructions provided by the processor to the one or more braking systems of the vehicle, the trailer, or both, when it is determined that the trailer sway of the trailer is sufficient to warrant mitigation based on a number of the plurality of peak values and respective magnitudes of the plurality of peak values of the oscillation signal.

15. The vehicle of claim 10, wherein the processor is further configured to at least facilitate mitigating the trailer sway, via the instructions provided by the processor to a vehicle braking system of the vehicle for application of uniform or differential braking on a rear axle of the vehicle based on the application of the band-pass filter to the hitch articulation angle and the yaw rate.

16. The vehicle of claim 10, wherein the processor is further configured to at least facilitate mitigating the trailer sway, via the instructions provided by the processor to a vehicle braking system of the vehicle for application of differential braking on a front axle of the vehicle based on the application of the band-pass filter to the hitch articulation angle and the yaw rate.

* * * * *